Figure 1:
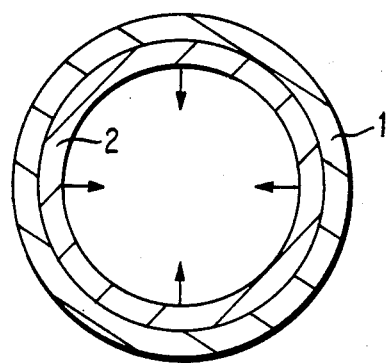

United States Patent [19]

Kleinheins, Gerhard H.

[11] Patent Number: 4,650,703
[45] Date of Patent: Mar. 17, 1987

[54] RECOVERABLE ARTICLE AND METHOD

[75] Inventor: Kleinheins, Gerhard H., Steinhoering, Fed. Rep. of Germany

[73] Assignee: Raychem GmbH, Putzbrunn, Fed. Rep. of Germany

[21] Appl. No.: 726,866

[22] Filed: Apr. 25, 1985

[30] Foreign Application Priority Data

Apr. 26, 1984 [GB] United Kingdom ............... 8410672

[51] Int. Cl.⁴ ............... F16L 9/14; B32B 31/00
[52] U.S. Cl. ............................. 428/36; 428/913;
174/DIG. 8; 138/140; 138/178; 156/52;
156/86
[58] Field of Search ................... 428/36, 913;
174/DIG. 8; 138/119, 140, 141, 178; 156/86,
49, 52

[56] References Cited

U.S. PATENT DOCUMENTS 4,207,364 6/1980 Nyberg ........................ 174/DIG. 8
4,234,758 11/1980 Guzy ........................... 174/DIG. 8
4,450,871 5/1984 Sato ............................. 428/36
4,576,871 3/1986 Destreich ..................... 428/36

FOREIGN PATENT DOCUMENTS 8072265 10/1973 Japan ...................... 174/DIG. 8

Primary Examiner—John E. Kittle
Assistant Examiner—James J. Seidleck
Attorney, Agent, or Firm—Edith A. Rice; Herbert G. Burkard

[57] ABSTRACT

A tubular heat recoverable article has two layers in thermal contact, one inside the other. The two layers have appreciably different recovery temperatures. Shrinking of the article on to a substrate is effected by applying heat to the outer layer (1) of higher recovery temperature such that conduction to the inner layer (2) of lower recovery temperature ensures that the inner layer (2) reaches its recovery temperature, and thus becomes elastomeric, before the outer layer begins to recover. The article, which may be used in an electric power cable splice, thus combines good storage life with good recovery time.

11 Claims, 2 Drawing Figures

RECOVERABLE ARTICLE AND METHOD

DESCRIPTION

This invention relates to a method of applying to an object an article that comprises two, or more, layers of heat-recoverable material, and to such an article.

A heat-recoverable article is an article the dimensional configuration of which may be made to change appreciably when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

Heat-recoverable articles are well known for encapsulating power cables, telecommunications cables, pipelines etcetera by being shrunk therearound to provide electrical and/or mechanical protection. Alternatively, heat-recoverable articles may be arranged to expand, or otherwise deform, so as to contact a surrounding body, for example to provide an internal lining for a pipeline, for corrosion protection for example, especially at a joint between pipes, or at a region of weakness. Such articles may be tubular, that is to say hollow and have one or two open ends (for example, end caps or sleeves respectively), and the tubular configuration may be preformed, as by extrusion or moulding for example, or may be formed in situ from a sheet and a suitable closure arrangement. Although the tubular articles may be of right-cylindrical configuration, it is also envisaged that they be of "L", "T", "Y", or other configuration. The tubular articles may, but need not, be of uniform cross-section.

It is often necessary to apply a total thickness of heat-recoverable material in excess of about three millimetres, sometimes in excess of five millimetres, and occasionally about twelve to fifteen or more millimeters thickness. Such applications arise, for example in terminating (with a sleeve or end cap) or jointing power cables, and especially high voltage cables, where the required thickness of insulation increases with the voltage class of the cable, and where stress grading and electrical screening may also be required. Such thickness may be provided by shrinking successively a plurality of comparatively thin wall tubes, at least some of which may be co-extruded or co-moulded, but this can be time-consuming and requires handling of a comparatively large number of components. Furthermore, problems may also arise with the formation of voids, or entrapment of contamination, at the interfaces between successive tubes, and clearly this would be exacerbated with a large number of interfaces. Severe difficulties are faced, however, in heat-recovering a single component that has an expanded thickness greater than about three millimeters. Such components require long heating times and often the installer, in order to speed up the process, tends to overheat the part which may result in severe damage to the heated surface by burning or blistering. Conversely, the installer may be too careful and, in order to prevent overheating, may not heat the component sufficiently. The result may be a component which has not recovered completely, leaving interfacial voids underneath. In some cases where the recovery forces from the outer layers of the component are too high and the innermost layers have not yet reached their shrink temperature, severe wrinkling can occur at the inner surface, which cannot easily be detected externally.

One solution to the heat-recovery of thick wall components is disclosed in British Patent specification No. 1440524 where a heat-shrinkable member is used in its expanded condition to hold out, for example by being bonded to, a stretched elastomeric member, which may be inside or outside the heat-shrinkable member. Thus, the required thickness is provided by both members, but in order to obtain recovery only sufficient heat is required to cause the heat-recoverable member to reach its crystalline melting temperature, and this takes a comparatively short time. This solution does, however, have limitations, in that with the heat-shrinkable material on the outside, the relative thickness of the two members has to be such that the hold out member can withstand the inherent restoring force of the stretched elastomeric member so as to avoid premature collapse of the article. High performance adhesives may be required to prevent interfacial disbonding of the article, and this adds to the cost of production.

It is an object of the present invention to provide a method of and article for disposing comparatively thick, heat-recoverable material, that is to say material that is of at least about three millimetre thickness before recovery, on to an object.

In accordance with one aspect of the present invention, there is provided a method of applying to an object an article that comprises two, or more, layers of heat-recoverable material having appreciably different recovery temperatures, wherein the article is arranged to be in a generally tubular shape prior to recovery, with one of said layers inside and in thermal contact with the other of said layers, wherein the article is disposed so as to be recovered into substantial conformity with the object with the layer having the lower recovery temperature disposed between the object and the other layer and wherein heat is directed on to the higher recovery temperature layer of the article in such a manner that the lower recovery temperature layer reaches its recovery temperature before the other layer starts to recover.

It will be appreciated that the heat to recover the article will be directed on to one of the layers, that having the higher recovery temperature, and that thermal conduction will cause the layer remote from the heat source to increase in temperature.

The difference between the recovery temperatures is understood to be "appreciable" if it is at least 5° C., and is preferably 10° C. or more.

The recovery temperature of each layer is to be determined by disposing the separate, or separated, layers in a circulating air oven whose temperature is slowly increased from ambient temperature, at a rate of 1° C. per minute. As the temperature increases, the layer will change from its original, heat-unstable, configuration prior to recovery, to its fully recovered configuration, i.e. the configuration to which it recovers in the absence of any external constraint. During this change, at least one, and usually only one, significant dimension of the layer will change appreciably. The recovery temperature of the layer is herein defined to be that temperature at which the above-mentioned significant dimension has changed by half of the total amount it changes between its unrecovered and fully recovered dimensions. For example, if a layer comprises a radially shrinkable tubular component that has an unrecovered outer diameter $a$ and a fully recovered outer diameter $b$, then the recovery temperature of the layer is the temperature at which it has shrunk to an extent such that its outer diameter is $(a+b)/2$.

Usually the heat-recoverable material will be cross-linked polymeric material.

Thus, with the present method, the lower recovery temperature layer, which will be the inner layer where the article is heat-shrinkable, will reach its recovery temperature, and thus become elastomeric, even though heat has been applied to the external surface of the higher recovery temperature layer. The higher recovery temperature layer thus temporarily prevents the other layer from recovering, for example by holding it out, until the continued application of heat raises the temperature to the higher recovery temperature. At this stage the article will recover.

The time taken to effect recovery is significantly reduced in comparison with the time taken to recover an article of the same wall thickness and consisting only of material having the higher recovery temperature. Although the shrink time may be less for an article of the same thickness but consisting only of material having the lower recovery temperature, such an article would have a significantly shorter shelf-storage time, particularly at high ambient temperatures. Furthermore, the method of the present invention substantially eliminates wrinkles at the contact surface between the article and the object, thus eliminating voids, which could otherwise cause severe electrical problems in a high voltage application for example. Full recovery of the article is assured since, for a shrinkable article for example, recovery will not take place until the inner layer is completely elastomeric. Since both layers are heat-recoverable, no problems occur with permanent set of one layer, interfacial disbonding, or premature recovery.

When the heating is applied to the article locally, that is to say other than by uniform heating of the whole article, it will be appreciated that local recovery of both layers will take place, whilst a remaining portion of the article, and in particular of the lower recovery temperature layer, will not be recovered. This will occur typically when recovery is effected by a gas torch, rather than in an oven. Heating in this way to effect recovery of the whole article may thus take place sequentially, for example from the centre to one end of the article and then from the centre to the other end, or alternatively from one end to the other.

It will be understood that, in general, when the article recovers in a shrinking mode so as to enclose a substrate object therewithin, heat will be applied to the outermost surface of the article. On the other hand, when the article recovers in an expanding mode so as to line a surrounding object, heat will be applied to the innermost surface of the article. In each case, however, the heat will be applied to the article such that it has to be transferred through the higher recovery temperature layer to the lower recovery temperature layer.

The article may be supplied as a preformed tubular article and thus slid over or into the object to be covered, or it may be provided as a sheet that is wrapped around the object and secured along opposing edges by a suitable closure arrangement.

It will be appreciated that the heat supplied to the article has to be controlled, since if the heat source delivers too much thermal energy, the layer nearest thereto, and having the higher recovery temperature, will reach its recovery temperature before sufficient thermal transfer to the lower recovery temperature layer can take place. On the other hand, if the heat source delivers too little thermal energy, the time required to effect recovery of the article will be inordinately long. Clearly, the amount of heat energy required will depend on such factors as the thicknesses and the thermal properties of the particular materials used for the layers, but it has generally been found that a heat source, for example a gas torch, hot heat blower or infra-red radiation heater, directing air substantially unidirectionally on to the article and delivering between $5 \times 10^3$ kJ/hr and $2 \times 10^5$ kJ/hr, and preferably about $5 \times 10^4$ kJ/hr is suitable for recovering articles having a total unrecovered thickness of up to about ten millimeters.

In accordance with a further aspect of the present invention, there is provided an article comprising two, or more, layers of heat-recoverable material having appreciably different recovery temperatures and a combined wall thickness before recovery of at least three millimeters, the article being arranged to be in a generally tubular shape prior to recovery, with one of said layers inside and in thermal contact with the other of said layers such that on recovery the article will substantially conform to an object over or inside which it is disposed with the layer having the lower recovery temperature located between the object and the other layer, wherein the two layers are arranged such that on heating the article the lower recovery temperature layer reaches its recovery temperature before the other layer starts to recover.

Preferably the two layers are in physical contact with one another, for example by being bonded together, and most preferably they are formed integrally, for example by co-extrusion or by co-moulding.

The following factors have to be taken into account when arranging for the heating to cause the lower recovery temperature layer to reach its recovery temperature before the other layer starts to recover: the layer thicknesses, the thermal conductivities, latent heats of fusion, density, specific heats and recovery temperatures of the materials of the layers, and the heat transfer coefficients at the interfaces between each of the layers, and between each layer and its surroundings.

The article may comprise at least one further layer, which may or may not be heat-recoverable. When the article comprises such a plurality of heat-recoverable layers, their recovery temperatures may be graduated such that each pair of successive layers has an appreciably different recovery temperature. One of the layers of the article may be an adhesive or a mastic, and may be provided as a coating deposited on another of the layers.

The combined wall thickness of the article prior to recovery may be at least five millimetres, and as much as ten to fifteen millimetres, or even more.

It will be appreciated that the method of said one aspect of the invention may employ the article of said further aspect of the invention.

A method and article, each in accordance with the present invention, will now be described, by way of example, with reference to FIGS. 1 and 2 of the accompanying drawings, which show in cross-section two embodiments of tubular articles.

Referring to the Figures, the article consists of a dual co-extrusion of two polymeric right-cylindrical tubular layers 1 and 2 that subsequent to extrusion has been heated, deformed and cross-linked so as to render it heat-recoverable. The materials used for the layers 1 and 2 are different such that, inter alia, the recovery temperature of the layer 2 is appreciably lower than that of the layer 1.

Figure 2:
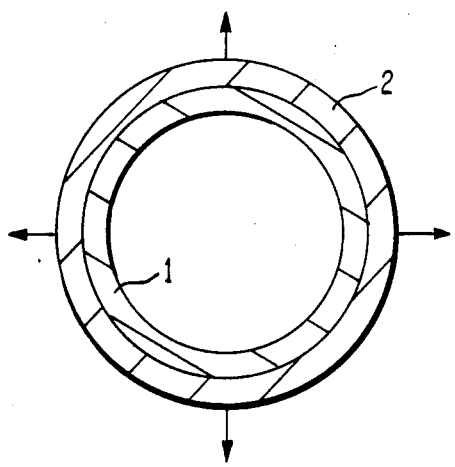

The article of FIG. 1 is arranged to be shrinkable radially inwards on application of heat so as to conform with a substrate, for example a joint of a high voltage power cable, around which it is disposed. The article of FIG. 2 is arranged to be expansible radially outwards on application of heat so as to conform with a surrounding member, for example a joint of an oil pipe line. In each case, the thermal properties of the material and the thicknesses of the two layers are so selected that heat applied, for example from a gas torch, to the layer 1 is conducted through to the layer 2 so as to ensure that the layer 2 fully reaches its recovery temperature, at least locally, before the layer 1 starts to recover, at least locally. The following table shows for the article of FIG. 1 various parameters, including the layer thicknesses, the recovery temperatures, in this case the crystalline melting temperatures, and the time taken for each layer to reach its recovery temperature. The table also shows for comparison the same parameters for a conventional co-extruded heat-shrinkable article, not in accordance with the present invention.

|  | Layer | Material | Thickness mm | Crystalline Melt Temp. °C. | Average Specific Heat Joules g deg | Thermal Conductivity Joules cm sec deg | Time to reach recovery temp. (secs) |
|---|---|---|---|---|---|---|---|
| Article of FIG. 1 | outer (1) | modified polyolefin | 0.7 | 109.5 | 4.5 | $2.1 \times 10^{-3}$ | 88 |
|  | inner (2) | conductive carbon black filled polyolefin | 2.8 | 79 | 2.2 | $8.4 \times 10^{-3}$ | 37 |
| Conventional Article | outer | conductive carbon black filled polyolefin | 0.7 | 93 | 2.7 | $3.8 \times 10^{-3}$ | 12 |
|  | inner | modified ethylene propylene co-polymer | 2.8 | 105 | 2.3 | $2.1 \times 10^{-3}$ | 129 |

For each of the articles, the outer surface was exposed to a constant 120° C. from a gas torch of $5 \times 10^4$ kJ/hr. As can be seen from the table, the total wall thickness of each article is the same, namely 3.5 mm.

As shown in the table, the inner layer of the article of FIG. 1 reaches its shrink temperature after 37 seconds, and is then in an elastomeric state in which it is held out by the outer layer 1 which has not yet reached its shrink temperature. This higher temperature is reached after 88 seconds, at which time the article as a whole shrinks. On the other hand, it is seen that the outer layer of the conventional article reaches its shrink temperature after 12 seconds, but the article cannot shrink until the inner layer reaches its shrink temperature at 129 seconds. Thus, for the same total thickness, it will be noted that a very significant saving is achieved in shrink time of the article in accordance with the present invention. Furthermore, the disadvantages of the conventional article, discussed above, are also avoided.

I claim:

1. A method of applying to an object an article that comprises two layers of heat-recoverable material each of said layers being heat-recoverable and having an appreciably different recovery temperature than the other of said layers, wherein the article is arranged to be in a generally tubular shape prior to recovery, with one of said layers inside and in thermal contact with the other of said layers, wherein the article is disposed so as to be recovered into substantial conformity with the object with the layer having the lower recovery temperature disposed between the object and the other layer, and wherein heat is directed on to the higher recovery temperature layer of the article in such a manner that the lower recovery temperature layer reaches its recovery temperature before the other starts to recover.

2. A method according to claim 1, wherein the article is preformed as a tubular article and is slid over or into the object prior to recovery into conformity therewith.

3. A method according to claim 1, wherein the lower recovery very temperature layer of the article is inside the other layer, and the article is disposed around the object so as to recover by shrinking into conformity therewith.

4. A method according to claim 1, wherein the heat applied to recover said two layers is between about $5 \times 10^3$ kJ/hr and about $2 \times 10^5$ kJ/hr.

5. An article comprising two layers of heat-recoverable material each of said layers being heat-recoverable and having an appreciably different recovery temperature than the other of said layers, said article having a combined wall thickness before recovery of at least three millimeters, the article being arranged to be in a generally tubular shape prior to recovery, with one of said layers inside and in thermal contact with the other of said layers such that on recovery the article will substantially conform to an object over or inside which it is disposed with the layer having the lower recovery temperature located between the object and the other layer, wherein the two layers are arranged such that on heating the article the lower recovery temperature layer reaches its recovery temperature before the other layer starts to recover.

6. An article as claimed in claim 5, wherein the layer thicknesses, the thermal conductivities, latent heats of fusion, density, specific heats and recovery temperatures of the materials of the layers, and the heat transfer coefficients at the interfaces between each of the layers, and between each layer and its surroundings, are so arranged that on heating the article the lower recovery temperature layer reaches its recovery temperature before the other layer starts to recover.

7. An article according to claim 5, wherein the layers are of polymeric material and the lower recovery temperature layer reaches its crystalline melting temperature before the other layer starts to recover.

8. An article according to claim 5, wherein the two layers are formed integrally with one another.

9. An article according to claim 5, formed as a generally tubular article.

10. An article according to claim 5, wherein the lower recovery temperature layer of the article is inside the other layer, and the article is arranged to recover by shrinking.

11. An article according to claim 5, wherein the combined wall thickness of said two layers before recovery is at least about five millimetres.

* * * * *